(12) United States Patent
Sacks et al.

(10) Patent No.: US 8,909,719 B2
(45) Date of Patent: Dec. 9, 2014

(54) METHOD OF MANAGING FEEDS BASED ON CLASSIFICATIONS

(75) Inventors: David Oliver Sacks, San Francisco, CA (US); Adam Marc Pisoni, San Francisco, CA (US); Kris Branson Gale, San Francisco, CA (US)

(73) Assignee: Yammer, Inc., San Francisco, CA (US)

( * ) Notice: Subject to any disclaimer, the term of this patent is extended or adjusted under 35 U.S.C. 154(b) by 0 days.

(21) Appl. No.: 13/430,546

(22) Filed: Mar. 26, 2012

(65) Prior Publication Data
US 2013/0024526 A1 Jan. 24, 2013

Related U.S. Application Data

(60) Provisional application No. 61/467,309, filed on Mar. 24, 2011.

(51) Int. Cl.
*G06F 15/16* (2006.01)
*H04L 12/58* (2006.01)
*G06Q 10/10* (2012.01)
*H04L 12/18* (2006.01)
*G06Q 50/00* (2012.01)

(52) U.S. Cl.
CPC ............. *G06Q 10/10* (2013.01); *H04L 51/16* (2013.01); *H04L 12/1859* (2013.01); *G06Q 50/01* (2013.01)
USPC ........................................................ 709/206

(58) Field of Classification Search
CPC .............................. H04L 51/16; G06Q 50/01
USPC ........................................................ 709/206
See application file for complete search history.

(56) References Cited

U.S. PATENT DOCUMENTS

2009/0249451 A1* 10/2009 Su et al. ............................ 726/5

* cited by examiner

*Primary Examiner* — Noel Beharry
*Assistant Examiner* — Farhad Ali
(74) *Attorney, Agent, or Firm* — Tom Wong; Jim Ross; Micky Minhas (57) ABSTRACT

Primary and secondary messages are included in a feed according to a "full thread" mode or a "stream" mode. The "full thread" mode causes a feed, when viewed, to include both primary and secondary messages. In contrast, the "stream" mode causes a feed, when viewed, to include only primary messages. In this way, a feed viewed in "full thread" mode provides to users a comprehensive view of messages included in the feed. Alternatively, a feed viewed in "stream" mode provides to users a concise view messages included in the feed.

18 Claims, 9 Drawing Sheets

Create seven feeds in
feed_keys table 302 feed_keys table

| id | feed_description | count_all | count_primary |
|---|---|---|---|
| 1 | feed_thread_id100_net1 | 0 | 0 |
| 2 | feed_sent_id1_net1 | 0 | 0 |
| 3 | feed_general_id1_net1 | 0 | 0 |
| 4 | feed_user_id1_net1 | 0 | 0 |
| 5 | feed_all_id1_net1 | 0 | 0 |
| 6 | feed_following_id1_net1 | 0 | 0 |
| 7 | feed_following_id2_net1 | 0 | 0 |

Create seven new threads in
feed_messages_threaded
table 304 feed_messages_threaded table

| id | feed_key_id | max_message_id | thread_id | count_primary |
|---|---|---|---|---|
| 1 | 1 | 0 | 100 | 0 |
| 2 | 2 | 0 | 100 | 0 |
| 3 | 3 | 0 | 100 | 0 |
| 4 | 4 | 0 | 100 | 0 |
| 5 | 5 | 0 | 100 | 0 |
| 6 | 6 | 0 | 100 | 0 |
| 7 | 7 | 0 | 100 | 0 |

Create seven new messages
in feed_messages table 306 feed_messages table

| id | feed_key_id | message_id | primary_delivery | thread_id |
|---|---|---|---|---|
| 1 | 1 | 100 | TRUE | 100 |
| 2 | 2 | 100 | TRUE | 100 |
| 3 | 3 | 100 | TRUE | 100 |
| 4 | 4 | 100 | TRUE | 100 |
| 5 | 5 | 100 | TRUE | 100 |
| 6 | 6 | 100 | TRUE | 100 |
| 7 | 7 | 100 | TRUE | 100 |

Figure 3A

300 count_all and count_primary are updated accordingly 308

| feed_keys table | | | |
|---|---|---|---|
| id | feed_description | count_all | count_primary |
| 1 | feed_thread_id100_net1 | 0-->1 | 0-->1 |
| 2 | feed_sent_id1_net1 | 0-->1 | 0-->1 |
| 3 | feed_general_id1_net1 | 0-->1 | 0-->1 |
| 4 | feed_user_id1_net1 | 0-->1 | 0-->1 |
| 5 | feed_all_id1_net1 | 0-->1 | 0-->1 |
| 6 | feed_following_id1_net1 | 0-->1 | 0-->1 |
| 7 | feed_following_id2_net1 | 0-->1 | 0-->1 | count_primary and max_message_id are updated accordingly 310

| feed_messages_threaded table | | | | |
|---|---|---|---|---|
| id | feed_key_id | max_message_id | thread_id | count_primary |
| 1 | 1 | 0-->100 | 100 | 0-->1 |
| 2 | 2 | 0-->100 | 100 | 0-->1 |
| 3 | 3 | 0-->100 | 100 | 0-->1 |
| 4 | 4 | 0-->100 | 100 | 0-->1 |
| 5 | 5 | 0-->100 | 100 | 0-->1 |
| 6 | 6 | 0-->100 | 100 | 0-->1 |
| 7 | 7 | 0-->100 | 100 | 0-->1 |

Figure 3B

400 feed_keys table — Create two new feeds in feed_keys table 402

| id | feed_description | count_all | count_primary |
|---|---|---|---|
| 1 | feed_thread_id100_net1 | 1 | 1 |
| 2 | feed_sent_id1_net1 | 1 | 1 |
| 3 | feed_general_id1_net1 | 1 | 1 |
| 4 | feed_user_id1_net1 | 1 | 1 |
| 5 | feed_all_id1_net1 | 1 | 1 |
| 6 | feed_following_id1_net1 | 1 | 1 |
| 7 | feed_following_id2_net1 | 1 | 1 |
| 8 | feed_sent_id2_net1 | 0 | 0 |
| 9 | feed_user_id2_net1 | 0 | 0 | feed_messages_threaded table — Create two new threads in feed_messages_threaded table 404

| id | feed_key_id | max_message_id | thread_id | count_primary |
|---|---|---|---|---|
| 1 | 1 | 100 | 100 | 1 |
| 2 | 2 | 100 | 100 | 1 |
| 3 | 3 | 100 | 100 | 1 |
| 4 | 4 | 100 | 100 | 1 |
| 5 | 5 | 100 | 100 | 1 |
| 6 | 6 | 100 | 100 | 1 |
| 7 | 7 | 100 | 100 | 1 |
| 8 | 8 | 0 | 100 | 0 |
| 9 | 9 | 0 | 100 | 0 | feed_messages table — Create nine new messages in feed_messages table 406

| id | feed_key_id | message_id | primary_delivery | thread_id |
|---|---|---|---|---|
| ... | ... | ... | ... | ... |
| 8 | 1 (feed_thread_id100_net1) | 101 | TRUE | 100 |
| 9 | 3 (feed_general_id1_net1) | 101 | TRUE | 100 |
| 10 | 5 (feed_all_id1_net1) | 101 | TRUE | 100 |
| 11 | 7 (feed_following_id2_net1) | 101 | TRUE | 100 |
| 12 | 8 (feed_sent_id2_net1) | 101 | TRUE | 100 |
| 13 | 9 (feed_user_id2_net1) | 101 | TRUE | 100 |
| 14 | 2 (feed_sent_id1_net1) | 101 | FALSE | 100 |
| 15 | 4 (feed_user_id1_net1) | 101 | FALSE | 100 |
| 16 | 6 (feed_following_id1_net1) | 101 | FALSE | 100 |

Figure 4A

400 count_all and count_primary are updated accordingly 408

| feed_keys table ||||
|---|---|---|---|
| id | feed_description | count_all | count_primary |
| 1 | feed_thread_id100_net1 | 1-->2 | 1-->2 |
| 2 | feed_sent_id1_net1 | 1-->2 | 1 |
| 3 | feed_general_id1_net1 | 1-->2 | 1-->2 |
| 4 | feed_user_id1_net1 | 1-->2 | 1 |
| 5 | feed_all_id1_net1 | 1-->2 | 1-->2 |
| 6 | feed_following_id1_net1 | 1-->2 | 1-->2 |
| 7 | feed_following_id2_net1 | 1-->2 | 1-->2 |
| 8 | feed_sent_id2_net1 | 0-->1 | 0-->1 |
| 9 | feed_user_id2_net1 | 0-->1 | 0-->1 | count_primary and max_message_id are updated accordingly 410

| feed_messages_threaded table ||||
|---|---|---|---|
| id | feed_key_id | max_message_id | thread_id | count_primary |
| 1 | 1 | 100-->101 | 100 | 1-->2 |
| 2 | 2 | 100-->101 | 100 | 1 |
| 3 | 3 | 100-->101 | 100 | 1-->2 |
| 4 | 4 | 100-->101 | 100 | 1 |
| 5 | 5 | 100-->101 | 100 | 1-->2 |
| 6 | 6 | 100-->101 | 100 | 1-->2 |
| 7 | 7 | 100-->101 | 100 | 1-->2 |
| 8 | 8 | 0-->101 | 100 | 0-->1 |
| 9 | 9 | 0-->101 | 100 | 0-->1 |

METHOD OF MANAGING FEEDS BASED ON CLASSIFICATIONS

CROSS-REFERENCE TO RELATED APPLICATIONS

This application claims priority benefit to U.S. provisional patent application titled, "METHOD OF MANAGING FEEDS BASED ON CLASSIFICATIONS" filed on Mar. 24, 2011, having application Ser. No. 61/467,309, and is incorporated by reference herein.

BACKGROUND

Micro-blogging has become an effective means for collaborative discussion by allowing participants to share information at any given moment on a topic. In the Yammer® micro-blogging service, each participant is included in a client social network that is associated with the domain portion of their email address. For example, if Joe (joe@foo.com) and Bob (bob@foo.com) register with Yammer®, then both are automatically included in the foo.com client social network. Further, if Mike (mike@loo.com) and Greg (greg@loo.com) register with Yammer®, then both are automatically included in the loo.com client social network. Users may collaborate within the loo.com client social network via message "feeds."

A message feed is a collection of threads and a thread is a collection of messages. A first message in the thread is a "thread starter message." Users add to the thread by replying to the thread starter message or to other replies in the thread. Typically, a message feed is subscribed to by a user for his or her viewing. Examples of feeds include messages generated by a specific user, messages associated with a particular subject matter, messages associated with a keyword tag, or the like. For example, Mike may subscribe to a feed that includes messages associated with the micro-blogging activity of Joe, and/or may subscribe to a feed that includes all messages that are tagged with the keyword "software development." Users may review and/or contribute to these message feeds and message threads and participate in the micro-blogging service.

Though message feeds and message threads provide some level of organization to the manner in which micro-blogging activity is delivered to users of the micro-blogging service, they are typically fixed and do not enable users to customize the inclusion and/or visibility of messages included therein. As a result, message feeds and/or message threads often include irrelevant messages that decrease overall user experience and wastefully consume processing and network resources.

SUMMARY

One or more embodiments of the present invention provide a method of including primary messages and secondary messages in feeds. A primary message is a message that qualifies for a feed, and a secondary message is a message that is associated with a primary message. Primary and secondary messages are included in a feed according to a "full thread" mode or a "stream" mode. The "full thread" mode causes a feed, when viewed, to include both primary and secondary messages. In contrast, the "stream" mode causes a feed, when viewed, to include only primary messages. In this way, a feed viewed in "full thread" mode provides to users a comprehensive view of messages included in the feed. Alternatively, a feed viewed in "stream" mode provides to users a concise view messages included in the feed.

A method for managing feed views, according to an embodiment of the present invention, includes the steps of receiving a request to view a feed, and determining a mode of viewing the feed, the mode of viewing including first and second modes. When the mode of viewing is the first mode, a page that includes messages that qualify for the feed and does not include messages that do not qualify for the feed is generated. When the mode of viewing is the second mode, a page that includes messages that qualify for the feed and messages that do not qualify for the feed is generated.

A method for managing feeds, according to another embodiment of the present invention, includes the steps of receiving a request for a feed, the request including a mode of viewing the feed, the mode of viewing including first and second modes. When the mode of viewing is the first mode, messages that qualify for the feed are retrieved and messages that do not qualify for the feed are not retrieved. When the mode of viewing is the second mode, messages that do not qualify for the feed are retrieved in addition to messages that qualify for the feed.

A method for managing feed views, according to an embodiment of the present invention, includes the steps of receiving first and second requests to view a feed, where the first request is from a first user and the second request from a second user, each request including a mode of viewing the feed, the mode of viewing including first and second modes. The steps further include determining that the mode of viewing in the first request is the first mode and transmitting a page that includes messages that qualify for the feed and does not include messages that do not qualify for the feed to the first user, and determining that the mode of viewing in the second request is the second mode and transmitting a page that includes messages that qualify for the feed and messages that do not qualify for the feed to the second user.

Further embodiments of the present invention include, without limitation, a non-transitory computer-readable storage medium that includes instructions that enable a processing unit to implement one or more aspects of the above methods.

BRIEF DESCRIPTION

DETAILED DESCRIPTION

Figure 1:
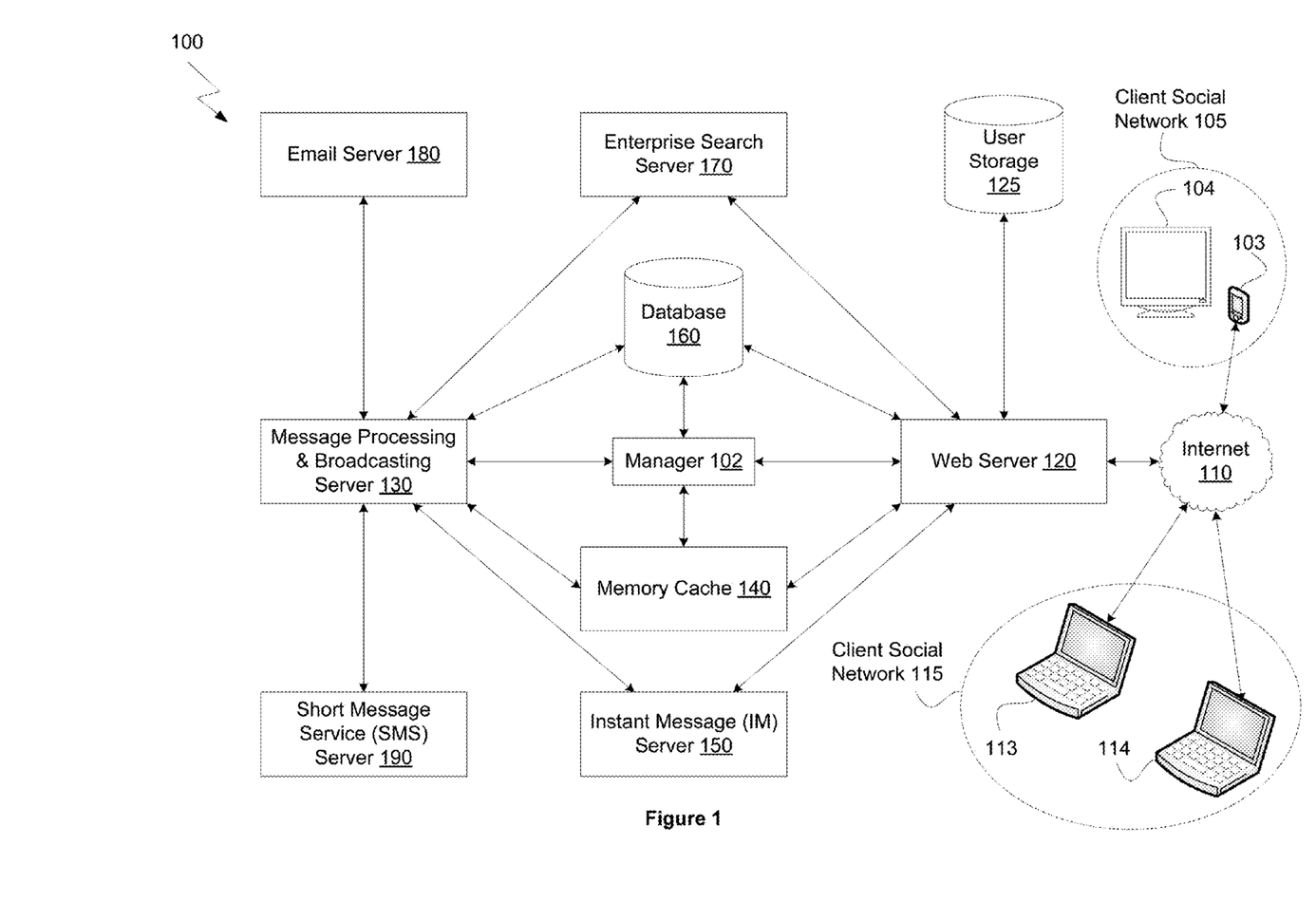
FIG. 1 illustrates an exemplary system for collaborative short messaging and discussion according to one embodiment of the present invention.

FIG. 1 illustrates an exemplary system for a micro-blogging system 100, according to one or more embodiments of the present invention. As shown, micro-blogging system 100 includes a manager 102, client devices 103, 104, 113, and 114, web server 120, user storage 125, message processing and broadcasting server 130, memory cache 140, instant message (IM) server 150, database 160, enterprise search server 170, email server 180, and short message service (SMS) server 190.

In the embodiment illustrated, micro-blogging system 100 is an online service that is connected to client devices 103, 104, 113, and 114 over internet 110. Manager 102 is a software module running on a computing device that includes a processor and memory and controls the overall operation of micro-blogging system 100. Alternatively, the connection may be over Wide Area Networks (WANs), Local Area Networks (LANs), or any other system of interconnection enabling two or more devices to exchange information. Client devices 103, 104, 113, and 114 allow access to web server 120 via browsers such as Microsoft Internet explorer, Apple Safari, Mozilla, Firefox or any other browser that supports HTML and JavaScript that may allow network access via the web. Examples of client devices 103, 104, 113, and 114 include personal computers and a mobile computing device, such as a smartphone.

In the embodiment illustrated in FIG. 1, users of micro-blogging system 100 are depicted as users of client devices 103, 104, 113, and 114. Users of client devices 103, 104 are shown as being registered (i.e., having a user account) in client social network 105 and users of client devices 113, 114 are shown as being registered (i.e., having a user account) in client social network 115. Only two client social networks are shown in FIG. 1 to simplify the description but in practice there may be a large number of client social networks. Attributes of client social networks are managed by manger 102. Client social networks 105, 115 are depicted in dotted circles to indicate the relationship between users of client devices 103, 104 (i.e., they belong to the same client social network 105) and the relationship between users of client devices 113, 114 (i.e., they belong to the same client social network 115).

As is described in detail herein, a client social network is a collection of users and content generated by one or more users. Manger 102 maintains isolation between client social networks so that a user registered in one client social network has the ability to see public information of other users in that client social network—but not any information in a different client social network, unless the user has been specifically granted such access. In one embodiment, each user is registered in a client social network that is associated with the domain portion of the user's email address. For example, in FIG. 1, users of client devices 103, 104 are registered in client social network 105 because they share the same email domain (e.g., joe@foo.com and bob@foo.com). Likewise, users of client devices 113, 114 are registered in client social network 115 because they share the same email domain. Thus, in this example, each client social network is associated with a unique email domain.

Web server 120 is a web server that uses protocols and/or applications including Hypertext transfer Protocol (HTTP), File Transfer Protocol (FTP), Extensible Messaging and Presence Protocol (XMPP), or other similar connection protocols. The operating system may be Windows, LINUX, SUN Solaris, Mac OS, or other similar operating system. Users create an account on web server 120 and are registered in client social networks as described above. Messages are sent from client devices 103, 104, 113 or 114 to web server 120 through internet 110. Messages are received via web server 120, email server 180, and/or SMS server 190.

Message processing and broadcasting server 130 is a server capable of processing the content of messages, operating a message queue, and directing messages to the appropriate resource in micro-blogging system 100. The operating system may be Windows, LINUX, SUN Solaris, Mac OS, or other similar operating system. Message processing and broadcasting server 130 may distribute messages to email server 180, SMS server 190, IM server 150, memory cache 140, database 160, and enterprise search server 170.

Instant message server 150 is a server that uses protocols and/or applications for sending instant messages including, but not limited to, Extensible Messaging and Presence Protocol (XMPP), ejabberd, and Bi-Directional-Streams Over HTTP (BOSH). Enterprise search server 170 is a server using any protocol and/or application for enterprise searches such as Apache's Solr. User Storage 125 is a storage drive or other device capable of file storage.

The foregoing describes an exemplary micro-blogging system in which embodiments of the invention may be implemented. It is noted, however, that the techniques described herein are not limited to micro-blogging systems, but may be applied to any system in which electronic messages may be transmitted between users.

Figure 2:
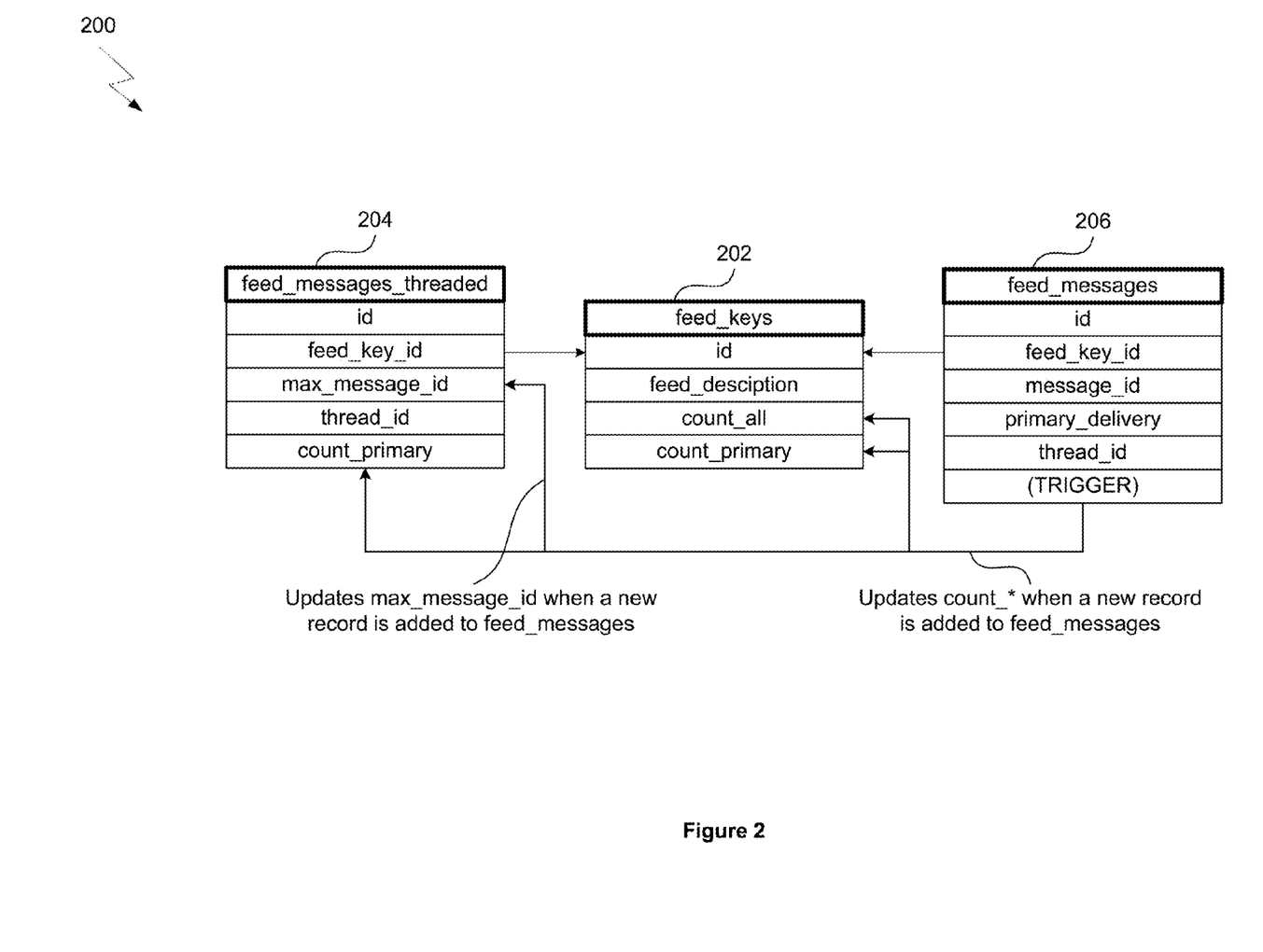
FIG. 2 is a is a block diagram illustrating database table configurations that enable the inclusion of primary and secondary messages in one or more feeds according to one embodiment of the present invention.

FIG. 2 is a block diagram illustrating database table configurations that enable the inclusion of primary and secondary messages in one or more feeds according to one embodiment of the present invention. It is noted that these database tables are not limited to include only those properties illustrated in FIG. 2 or described herein but may further include properties associated with, for example, secondary id's, creation times, update times, and the like. As described in further detail below, each message is associated with a primary delivery property that indicates whether the message qualifies for a feed (i.e., a primary delivery), or instead that the message is associated with other messages that qualify for the feed (i.e., a secondary delivery).

With reference to the illustrations in FIG. 2, a feed_keys table 202 is used to organize feeds that are accessible to one or more users of micro-blogging system 100. Specifically, the feed_keys table 202 includes an id property, a feed_description property, a count_all property and a count_primary property for each feed included therein. The id property is used to numerically and uniquely identify each feed included in feed_ keys table 202, e.g., "1"—while the feed_description property is used to descriptively identify each feed included in feed_keys table 202, e.g., "feed_user_id1_net1". The count_all and count_primary properties of each feed included in feed_keys table 202 are updated by a database trigger that is executed each time a new message is added to a feed_messages table 206, as described in further detail below. Here, the count_all property represents the total number of messages—both primary and secondary—included in the feed, while the count_primary property represents the total number of primary messages that are included in the feed.

A feed_messages_threaded table 204 is used to organize threads that are accessible via one or more feeds included in micro-blogging system 100. As shown, the feed_messages_threaded table 204 includes an id property, a feed_key_id property, a max_message_id property, a thread_id property and a count_primary property. Similar to the feed_keys table 202, the id property is used to uniquely identify each thread included in feed_messages_threaded table 204, e.g., "1". The feed_key_id property is equal to the id property of the feed in which the thread is included. The max_message_id property is updated, via a database trigger, to reflect the id property of the most recent message added to the feed_messages table 206 and included in the thread. The thread_id property is equivalent to the id property of the message included in feed_messages table 206 that is the thread starter message. The count_primary value is updated by the aforementioned database trigger that executes each time a new message is added to the feed_messages table 206.

The feed_messages table 206 is used to organize messages that are accessible via one or more feeds included in micro-blogging system 100. As shown, the feed_messages table 206 includes an id property, a feed_key_id property, a message_id property, a primary_delivery property and a thread_id property. Typically, though not shown, the feed_messages table 206 also includes a property for storing content of each message included therein, e.g., text and/or image data. Similar to the feed_keys table 202, the id property is used to uniquely identify each message included in feed_messages table 206, e.g., "1". The feed_key_id property is equal to the id property of the feed in which the message is included. The message_id property is a secondary identifier for the message. The primary_delivery property indicates whether the message is a primary message in the feed to which it belongs. Finally, the thread_id is equal to an id property of a thread included in feed_messages_threaded table 204 to which the message belongs.

Figure 3A:
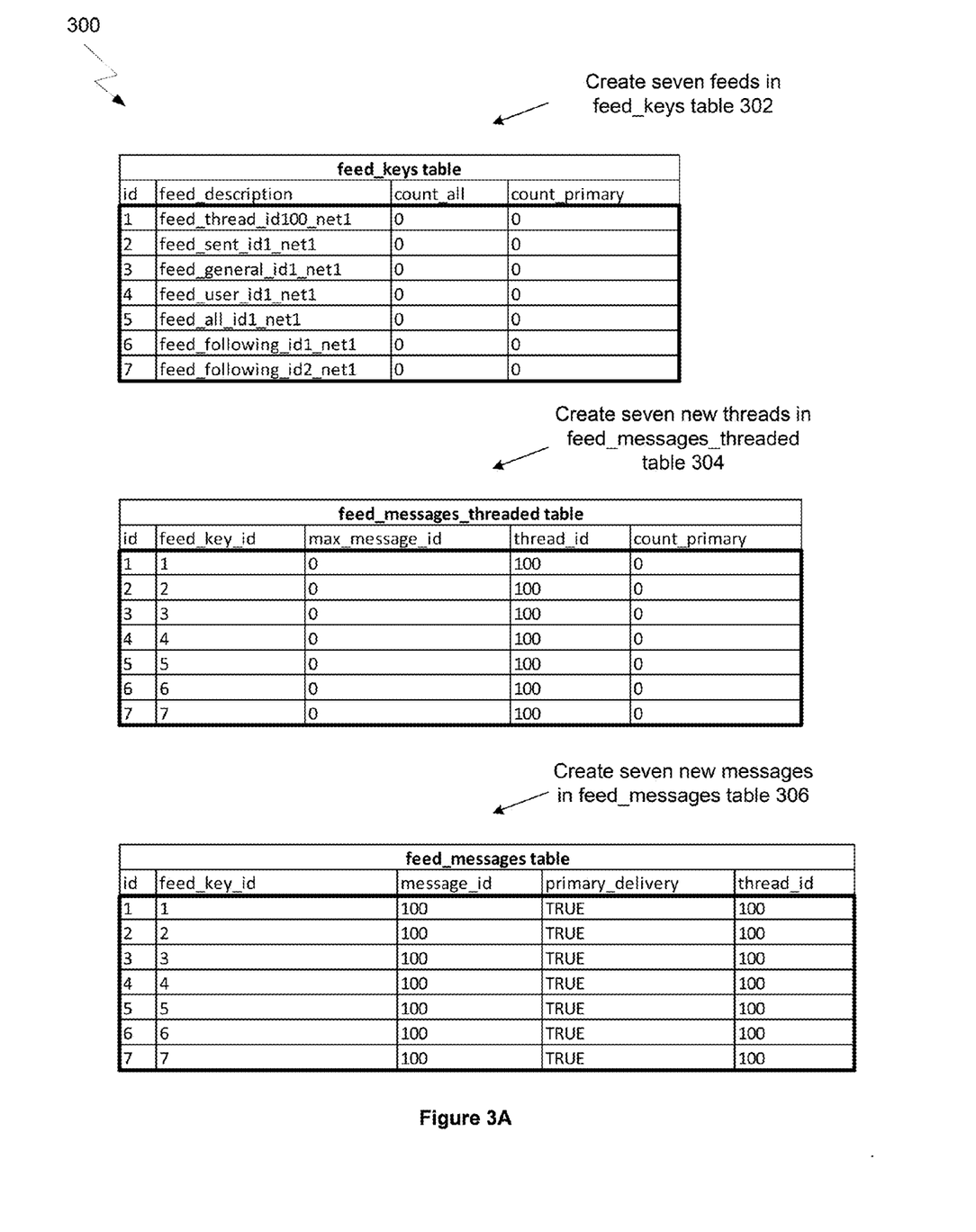
FIGS. 3A-3B are block diagrams that illustrate the creation and storage of a thread starter message according to one embodiment of the present invention.
Figure 3B:
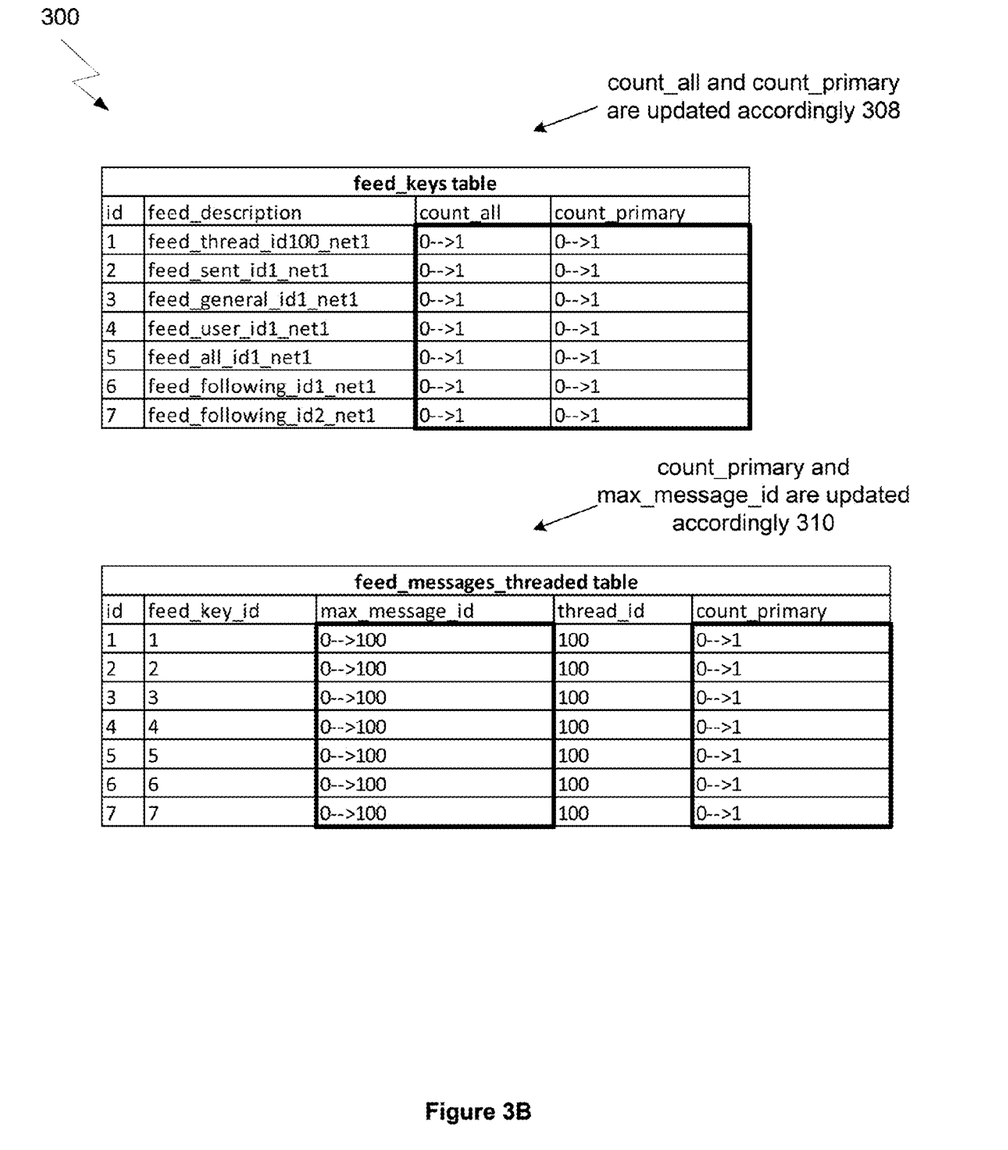

FIGS. 3A-3B are block diagrams that illustrate the creation and storage of a thread starter message 300 according to one embodiment of the present invention. The events 302-310 are executed in response to, for example, a first user creating a thread starter message within micro-blogging system 100, where a second user is subscribed to the first user. In this example, it is assumed that no feeds have been created within micro-blogging system 100 and, as a result, seven new feeds are added into feed_keys table 202, the details of which are described below.

As previously described, each feed included in feed_keys table 202 is representative of a different feed included in micro-blogging system 100. The feeds illustrated in FIG. 3A are added to feed_keys table 202 in response to both initializing micro-blogging system 100 with general feeds and the initialization of the first user account. For example, both the feed_general_id1_net1 and feed_all_id1_net1 feeds are representative of global network feeds that include messages visible to, e.g., a client social network in which the first user is included. Continuing with this example, feed_sent_id1_net1 is a feed that includes all messages sent by the first user, and the feed_user_id1_net1 is a feed that represents a main feed of the first user that is displayed when users view, for example, a profile page associated with the first user. Finally, the feed_following_id1_net1 is a feed that includes messages that the first user has specifically chosen to follow, e.g., messages that include a particular keyword, while the feed_following_id2_net1 is a feed that enables a second user to follow all messaging activity of the first user without viewing his or her profile page. Alternative feeds may also be generated, such as feed_thread_id100_net1—a feed that is specific to the messaging activity associated with the thread starter message 300.

Additional examples of feeds include all messages in a particular client network not in a specific group, messages in a specific group, messages in a specific group by a specific user, messages in a specific group also tagged with a specific keyword, private messages to a specific user, messages tagged with a specific keyword, messages from all bots "followed" by a specific user (see subscriptions below), messages from a specific bot, messages referencing or in reply to a specific user, messages representing a chain of replies, messages "followed" by a specific user (see subscriptions below), messages within a specific conversation which is an adhoc collection of messages not organized by reply chain, and messages marked by a specific user as favorites.

After the aforementioned seven feeds 1-7 are created, event 304 occurs, which involves creating seven new threads in the feed_messages_threaded table 204. Here, seven new threads are inserted in the feed_messages_threaded table 204 in response to the creation of thread starter message 300 since the thread starter message 300 is included in the seven separate and distinct feeds created above in event 302. As shown, the thread starter message 300 is associated with an id property of 100, and the max_message_id of the thread starter message 300 is, before the database trigger is executed, set to a default value of zero.

Event 306 involves creating seven new messages in the feed_messages table 206. Here, seven new messages are inserted in the feed_messages table 206 in response to the seven threads created in event 304. Because each of the messages are representative of the thread starter message 300, and because the thread starter message 300 qualifies for each of the feeds 1-7 included in feed_keys table 202, the primary_delivery property of each new message is set as "TRUE".

Turning now to FIG. 3B, in event 308 a database trigger causes the count_all and count_primary properties of each feed included in the feed_keys table 202 to be updated based on the messages 1-7 included in the feed_messages table 206. Specifically, because each of the messages 1-7 in the feed_messages table 206 has its primary_delivery property set as "TRUE", the count_primary value is incremented for each of the feeds included in the feed_keys table 202. The count_all property of each feed included in the feed_keys table 202 is then updated to be equal to the number of messages included in the feed_messages table 206 that have a feed_key_id property equal to the id property of the feed.

In event 310, the database trigger causes the max_message_id property of each thread included in the feed_messages_threaded table 204 to be set as the largest id property of the messages included in the feed_messages table 206 that belong to the thread. Similar to event 308, the count_primary property included in the feed_messages_threaded table 204 is updated accordingly. More specifically, because each of the messages 1-7 in the feed_messages table 206 has its primary_delivery property set as "TRUE", the count_primary value is incremented for the threads included in the feed_messages_threaded table 204. As is described in further detail below, these count properties are used to lower the latency involved in determining, for example, a total number of messages that a user has created within micro-blogging system 100, which can be used to facilitate efficient caching of messages.

Figure 4A:
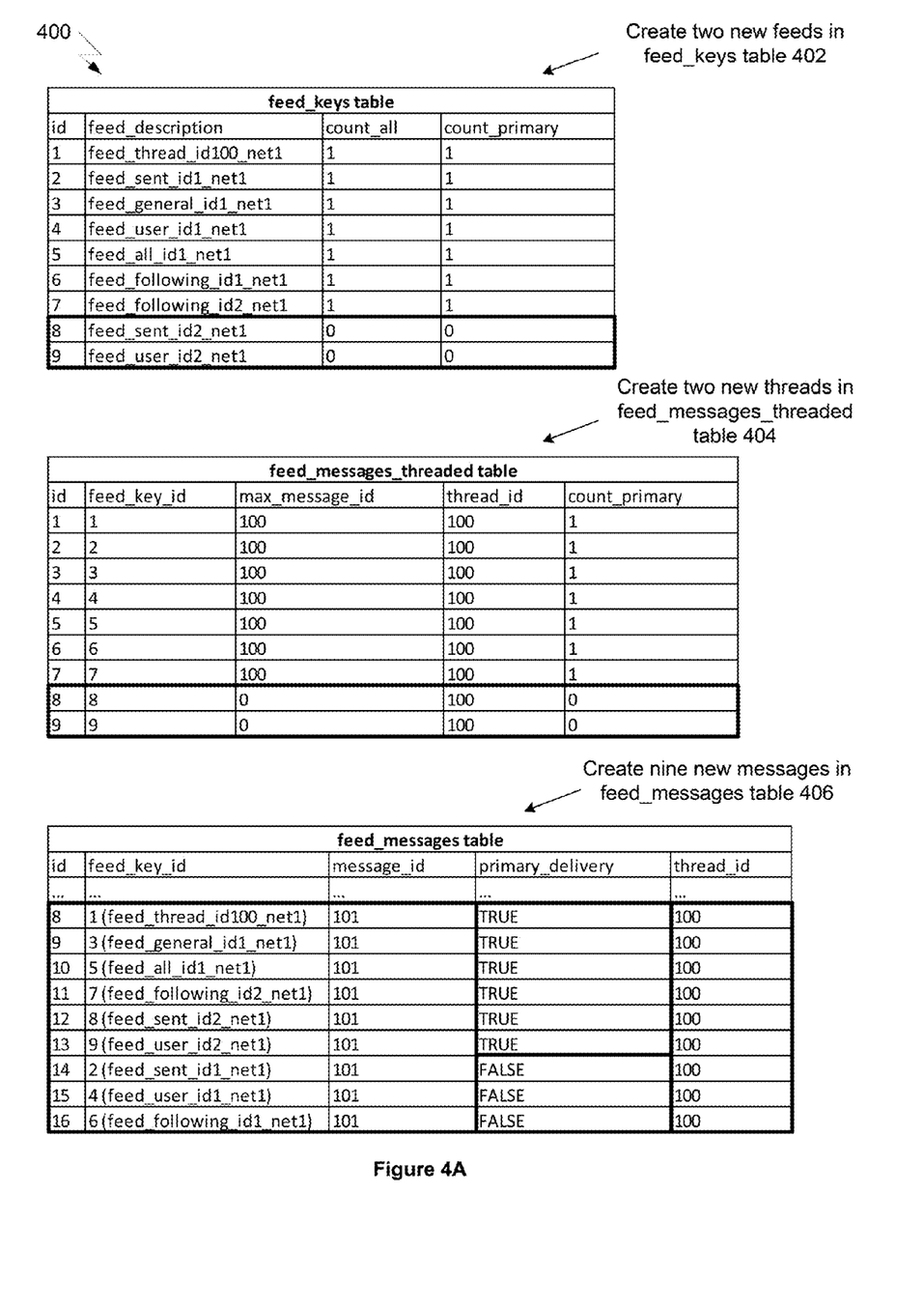
FIGS. 4A-4B are block diagrams that illustrate the creation and storage of a response message to a thread starter message according to one embodiment of the present invention.
Figure 4B:
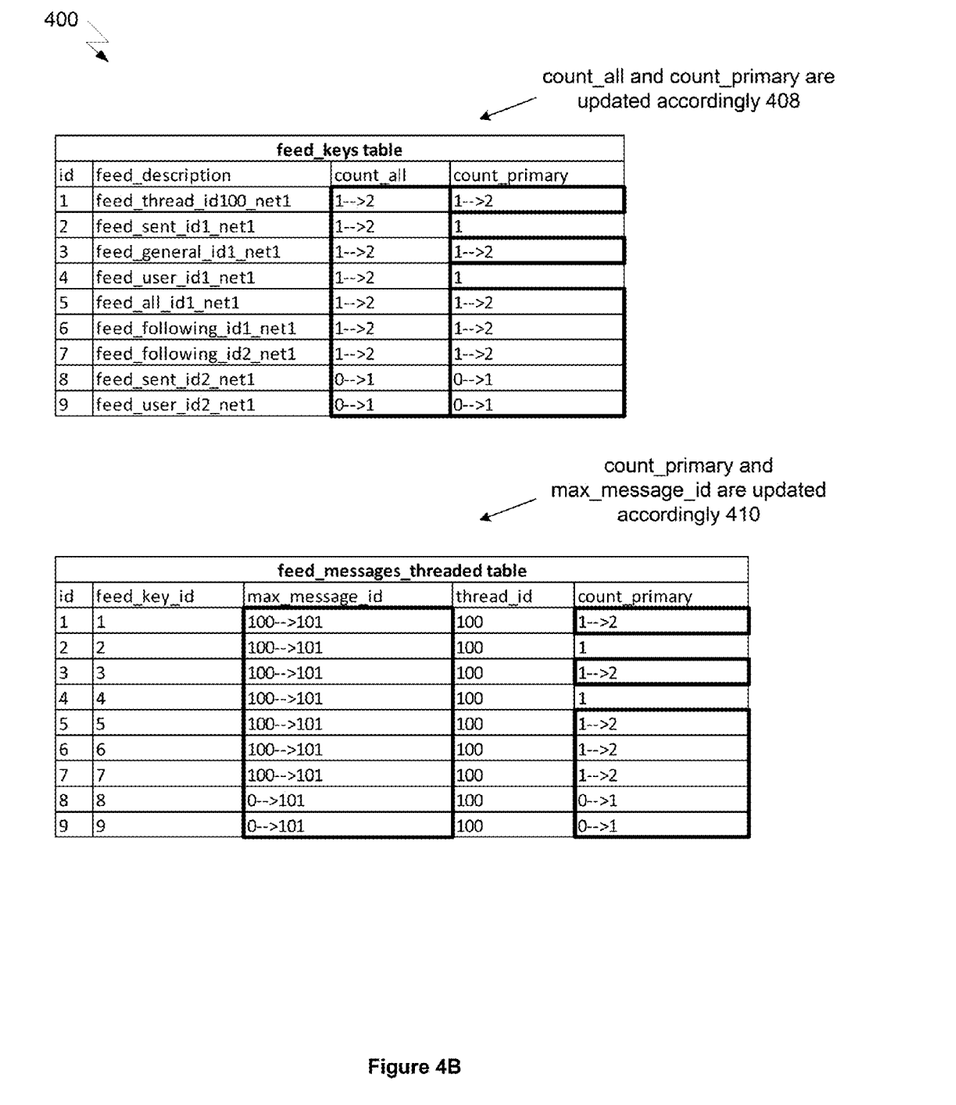

FIGS. 4A-4B are block diagrams that illustrate the creation and storage of a response message 400 to the thread starter message 300 according to one embodiment of the present invention. In particular, the events 402-410 are executed in response to the second user creating a message 400 in response to the thread starter message 300. In this example, it is assumed that the second user is being added to the micro-blogging system 100 in conjunction with the message 400 being inserted into the database 160. Accordingly, and as shown, event 402 involves creating two new feeds in the feed_keys table 202 associated with the second user, i.e., feed_sent_id2_net1 and feed_user_id2_net1. Such feeds provide the same functionality as the feed_sent_id1_net1 and the feed_user_id1_net1 feeds described above, but are associated with the second user instead of the first user. Event 404 involves creating two new threads in the feed_messages_threaded table 204. The two new threads 8-9 are inserted into the feed_messages_threaded table 204 in response to the creation of the feed_sent_id2_net1 and feed_user_id2_net1 feeds since the message 400 belongs to each of these feeds.

Event 406 involves creating nine new messages 8-16 in the feed_messages table 206 in response to the creation of the message 400. Specifically, a new message is created and designated as a primary delivery to each of the feed_thread_id100_net1 feed, the feed_general_id1_net1 feed, the feed_all_id1_net1 feed, the feed_following_id2_net1 feed, the feed_sent_id2_net1 feed and the feed_user_id2_net1 feed since the message 400 qualifies for each of these feeds. In contrast, a new message is also created as a secondary delivery to each of the feed_sent_id1_net1 feed, the feed_user_id1_net1 feed, and the feed_following_id1_net1 feeds since the message does not qualify for each of these feeds, but is associated with other messages that qualify for the feed.

Turning now to FIG. 4B, in event 408 the database trigger causes the count_all and count_primary properties of each feed included in the feed_keys table 202 to be updated according to the messages 1-16 included in the feed_messages table 206 and in the manner described above in conjunction with event 308 in FIG. 3B. The count_all property of each feed included in the feed_keys table 202 is updated to be equal to the number of messages included in the feed_messages table 206 that have a feed_key_id property equal to the id property of the feed.

In event 410, the database trigger causes the max_message_id property of each thread included in the feed_messages_threaded table 204 to be set as the largest id property of the messages included in the feed_messages table 206 that belong to the thread. Similar to event 408, the count_primary property included in the feed_messages_threaded table 204 is updated accordingly.

Thus, upon the completion of both the events 302-310 in FIGS. 3A-3B and the events 402-410 in FIGS. 4A-4B, a plurality of feeds, threads, and messages are included in database 160 and organized such that they can be easily materialized through low-latency database queries, as described in further detail below.

Figure 5:
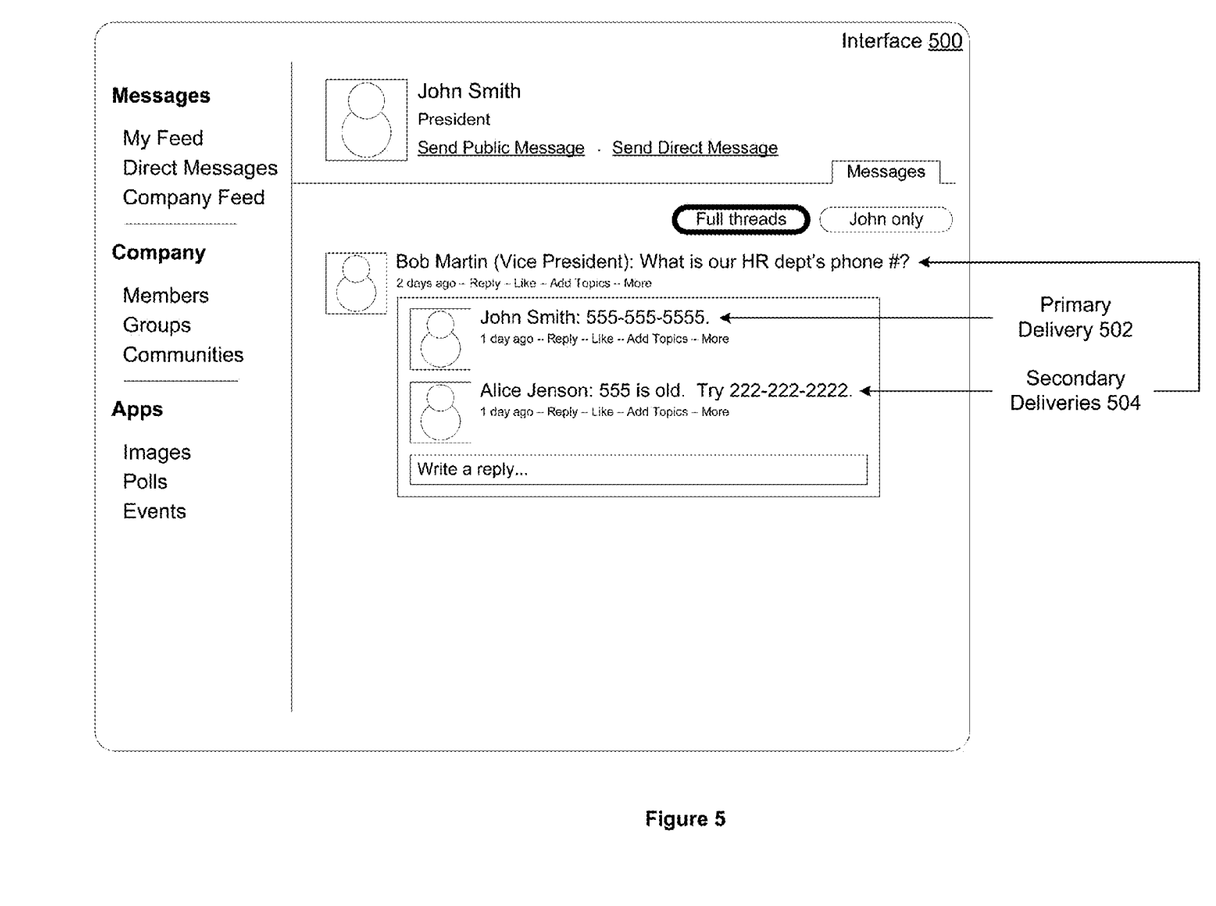
FIG. 5 is a is a conceptual diagram illustrating an interface in which both primary and secondary messages are included in a feed according to one embodiment of the present invention.

FIG. 5 is a conceptual diagram illustrating an interface 500 in which both primary and secondary messages are included in a feed according to one embodiment of the present invention. In one embodiment, the interface 500 is viewed via a web browser executing on a client device, e.g., client device 103. In another embodiment, interface 500 is designated application software for a personal computer operating Microsoft Windows, or Mac OS, or application software for a mobile device such as Apple's iPhone, RIM's Blackberry, or Google's Android for example.

As shown, the interface 500 displays a feed associated with John Smith, such as the feed_user_id1_net1 feed described above in conjunction with FIGS. 3A-4B. As also shown, the "Full threads" mode has been activated by a user viewing John Smith's feed so that he or she is able to view both primary and secondary delivery messages thereof. The database 160 may be queried for such primary and secondary delivery messages according to a variety of techniques. In one example, manager 102 receives a request from client device 103 to view John Smith's feed in "Full threads" mode. In response, manager 102 generates a query "SELECT thread_id ∥";" ∥ max_message_id FROM feed_messages_threaded WHERE feed_key_id=X" and routes the query to database 160, where X is set as the id property of the feeduser_id1_net1 feed. The database 160, upon processing this query, produces an output that includes a range of id properties of messages in the feed_messages table 206, e.g., [100:101]. This range can then be provided in a query to database 160 against the feed_messages table 206 to acquire the message with an id property of 100 and the message with an id property of 101 and materialize the feed for transmission to client device 103.

In the example illustrated in FIG. 5, assume the Bob Martin is the first user described above in conjunction with FIGS. 3A-4B, and that his thread starter message is the first thread starter message 300. Also assume that John Smith is the second user also described above in conjunction with FIGS. 3A-4B, and that his reply to Bob's thread starter message is the message 400. Accordingly, and because interface 500 displays John Smith's feed, all messages created by John Smith are primary deliveries to John Smith's feed—indicated as primary delivery 502—since each of these messages qualify for John Smith's feed. Alternatively, the messages created by Bob Martin and Alice Jenson are associated with other messages that qualify for the feed—i.e., John Smith's message—and are therefore included in John Smith's feed as secondary deliveries 504.

Figure 6:
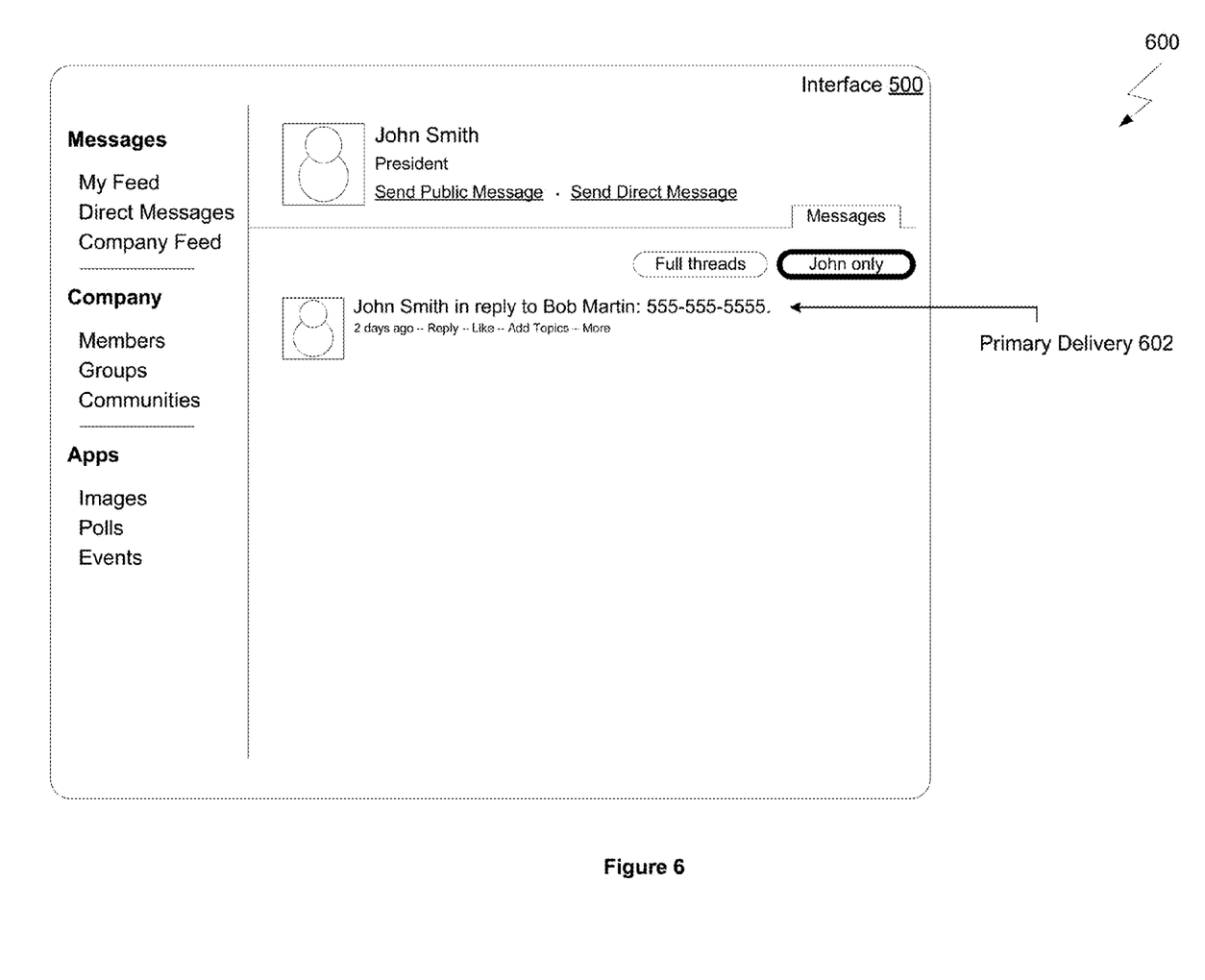
FIG. 6 is a is a conceptual diagram illustrating an interface in which only primary messages are included in a feed according to one embodiment of the present invention.

FIG. 6 is a conceptual diagram illustrating the interface 500 where only primary messages are included in John Smith's feed according to one embodiment of the present invention. The database 160 may be queried to include only primary delivery messages to the feed according to a variety of techniques. In one example, manager 102 receives a request from client device 103 to view John Smith's feed in "stream" mode. In response, manager 102 generates a query "SELECT message_id FROM feed_messages WHERE feed_key_id=X and primary='TRUE'" and routes the query to database 160, where X is set as the id property of the feed_user_id1_net1 feed. Continuing with the examples described above in conjunction with FIGS. 3A-5, the database 160, upon processing this query, produces id properties of messages in the feed_messages table 206 that are included in John Smith's feed and have a primary_delivery property set as true, i.e., the message included in feed_messages table 206 with an id property equal to 4. This id can then be provided in a query to database 160 against the feed_messages table 206 to acquire the message with an id property of 4 and materialize John Smith's feed for transmission to client device 103. Thus, in the primary deliver 602 example illustrated in FIG. 6, only primary messages are included in John Smith's feed, thereby providing the viewing user with a concise view of John Smith's messaging activity.

Figure 7:
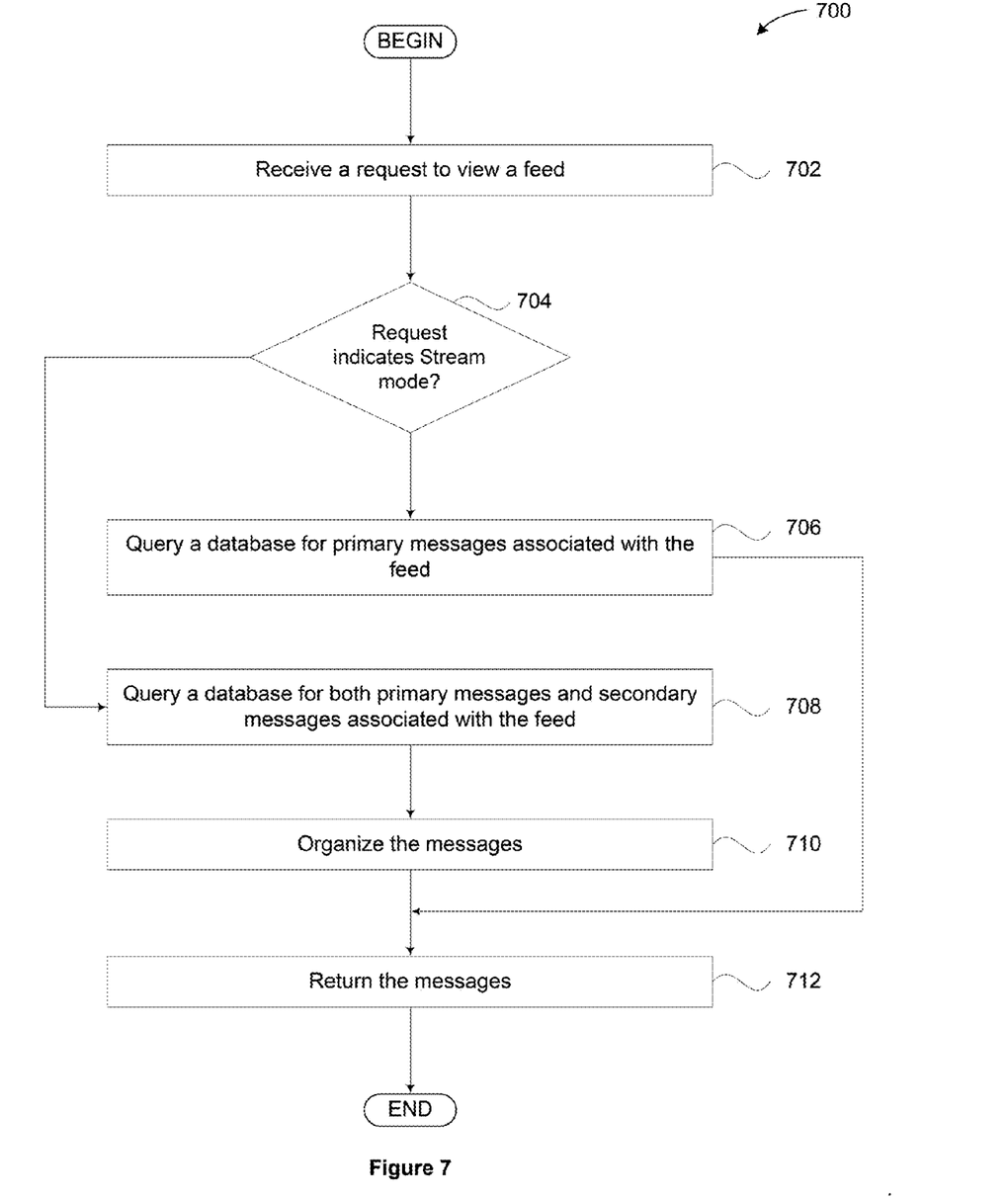
FIG. 7 is a flow diagram of a method of managing feed views according to or more embodiments of the invention.

FIG. 7 is a flow diagram of a method 700 of managing feed views according to or more embodiments of the invention. As shown, the method 700 begins at step 702, where manager 102 receives, from a user, a request to view a feed. At step 704, manager 102 determines whether the request indicates that the user desires to view the feed in "stream" mode. If so, then at step 706 manager 102 queries the database 160 for primary messages associated with the feed. Otherwise, at step 708 manager 102 queries the database 160 for both primary messages and secondary messages associated with the feed. At step 710, manager 102 generates a page that includes the messages. At step 712, manager 102 transmits the page.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

What is claimed is:

1. A computer-implemented method for managing feed views, comprising:
    receiving a request to view a feed;
    determining a mode of viewing the feed, the mode of viewing including first and second modes;
    when the mode of viewing is the first mode, generating a page that includes messages that qualify for the feed and does not include messages that do not qualify for the feed; and
    when the mode of viewing is the second mode, generating a page that includes messages that qualify for the feed and messages that do not qualify for the feed,
    wherein the messages that do not qualify for the feed comprise responses to the messages that qualify for the feed.

2. The method of claim 1, wherein the step of generating a page when the mode of viewing is the first mode comprises retrieving messages from a database that are associated with the feed and include a primary delivery property value set as true.

3. The method of claim 1, wherein the mode of viewing the feed is determined by examining a user input parameter.

4. The method of claim 1, wherein the request indicates the mode of viewing.

5. The method of claim 1, wherein a message qualifies for a feed of a user when the message is posted by the user.

6. The method of claim 1, wherein a message qualifies for a feed associated with a keyword when the message is tagged with the keyword.

7. The method of claim 1, wherein a message qualifies for a feed associated with a client social network when the message is posted by a user included in the client social network.

8. A computer-implemented method for managing feeds, comprising:
    receiving a request for a feed, the request including a mode of viewing the feed, the mode of viewing including first and second modes;
    when the mode of viewing is the first mode, retrieving messages that qualify for the feed and no messages that do not qualify for the feed; and
    when the mode of viewing is the second mode, retrieving messages that qualify for the feed and messages that do not qualify for the feed,
    wherein the messages that do not qualify for the feed comprise responses to the messages that qualify for the feed.

9. The method of claim 8, wherein the step of retrieving messages when the mode of viewing is the first mode comprises retrieving messages from a database that are associated with the feed and include a primary delivery property value set as true.

10. The method of claim 8, wherein the mode of viewing the feed is determined by examining a user input parameter.

11. The method of claim 8, wherein the request indicates the mode of viewing.

12. The method of claim 8, wherein a message qualifies for a feed of a user when the message is posted by the user.

13. The method of claim 8, wherein a message qualifies for a feed associated with a keyword when the message is tagged with the keyword.

14. The method of claim 8, wherein a message qualifies for a feed associated with a client social network when the message is posted by a user included in the client social network.

15. A computer-implemented method for managing feed views, comprising:
    receiving first and second requests to view a feed, wherein the first request is from a first user and the second request from a second user, each request including a mode of viewing the feed, the mode of viewing including first and second modes;
    determining that the mode of viewing in the first request is the first mode and transmitting a page that includes messages that qualify for the feed and does not include messages that do not qualify for the feed to the first user; and
    determining that the mode of viewing in the second request is the second mode and transmitting a page that includes messages that qualify for the feed and messages that do not qualify for the feed to the second user,
    wherein the messages that do not qualify for the feed comprise responses to any of the messages that qualify for the feed, and
    wherein none of the messages that qualify for the feed are responses to any other messages.

16. The method of claim 15, further comprising:
    receiving a request to change the mode of viewing from the first user to the second mode;

gathering messages that do not qualify for the feed;
updating the page to include the gathered messages that do not qualify for the feed; and
transmitting the page.

17. The method of claim 15, further comprising:
receiving a request to change the mode of viewing from the second user to the first mode;
removing, from the page, the messages that do not qualify for the feed; and
transmitting the page.

18. The method of claim 15, wherein:
a message qualifies for a feed of a user when the message is posted by the user;
a message qualifies for a feed associated with a keyword when the message is tagged with the keyword; and
a message qualifies for a feed associated with a client social network when the message is posted by a user included in the client social network.

* * * * *